United States Patent [19]

Grellmann et al.

[11] Patent Number: 4,598,334

[45] Date of Patent: Jul. 1, 1986

[54] CAPACITIVE TUNING SCREW

[75] Inventors: H. Erwin Grellmann, Beaverton; Keith E. Jones, Aloha; John A. Wright, Portland, all of Oreg.

[73] Assignee: Tektronix, Inc., Beaverton, Oreg.

[21] Appl. No.: 699,377

[22] Filed: Feb. 7, 1985

[51] Int. Cl.⁴ .................. H01G 5/16; F16B 33/00
[52] U.S. Cl. .................................. 361/290; 411/378
[58] Field of Search .............. 24/514, 569; 411/341, 411/386, 378; 361/290, 291, 287; 63/14 E, 14 F, 14 B

[56] References Cited

U.S. PATENT DOCUMENTS 1,304,986  5/1919  Kassler ........................ 24/569 X
2,858,679 11/1958  Moreschi ........................ 63/14 F
3,258,821  7/1966  Curran ........................... 24/569

FOREIGN PATENT DOCUMENTS 398667  9/1933  United Kingdom ............ 361/290
513950 10/1939  United Kingdom ............ 361/291

Primary Examiner—Donald A. Griffin
Attorney, Agent, or Firm—John P. Dellett; Francis I. Gray

[57] ABSTRACT

A capacitive tuning screw comprises a threaded portion with a longitudinal cavity for slidably receiving a plunger shaft. If the capacitive element on the tip of the plunger shaft contacts the corresponding capacitive element on the surface of an electrical circuit board or substrate, further turning of the screw will cause the shaft to slide into the cavity and prevent crushing the circuit board or substrate. A shoulder on the screw stops rotation and longitudinal movement of the screw before the entire length of the plunger shaft slides into the cavity.

11 Claims, 4 Drawing Figures

CAPACITIVE TUNING SCREW

BACKGROUND OF THE INVENTION

The present invention relates to a capacitive tuning screw and particularly to a capacitive tuning screw that prevents the damage of crushing a circuit board or substrate when the tuning screw comes into contact with and exerts pressure on the circuit board or substrate.

Conventional capacitive tuning screws have self-locking threads to prevent undesired movement after adjustment is completed. Adjustment or calibration of the instrument involves adjusting the clearance between the tip of the screw and a corresponding capacitive element on the surface of a circuit board or substrate. Unfortunately, friction between the self-locking threads of the screw and the threads of the hole make it difficult to determine if the screw has contacted the circuit board. Conventional capacitive tuning screws therefore may be turned too far so that the circuit board or substrate is crushed and irreparably damaged.

SUMMARY OF THE INVENTION

According to the present invention, a capacitive tuning screw comprises a first unthreaded portion having a shoulder and a second threaded cylindrical portion having a longitudinal cavity for reception of a plunger shaft. The plunger shaft extends from the tip of the screw to form a capacitive element corresponding to a capacitive element on the surface of an electrical circuit board or substrate. If the element on the end of the screw contacts the circuit board, the plunger shaft can slide into the cavity, thereby preventing further longitudinal travel of the element which could crush the circuit board or substrate. The plunger shaft into an extended positon. The cavity may also contain a spring to force the shoulder of the screw stops rotation and longitudinal travel of the screw before the entire length of the plunger shaft slides into the cavity.

In a first embodiment, the tuning screw further includes a spring coiled around the unthreaded portion in order to prevent undesired travel after adjustment is completed. In a second embodiment, a Johansen type self-locking screw also includes an extended head with a shoulder, and a cavity for reception of the plunger shaft.

It is accordingly an object of the present invention to provide an improved capacitive tuning screw that prevents damage to an electrical circuit board or substrate due to overturning of the screw and crushing of the circuit board or substrate.

Another object of the present invention is to provide an improved capacitive tuning screw that is self-locking and is repeatedly readjustable after contact between the screw and the circuit board or substrate.

The subject matter of the present invention is particularly pointed out and distinctly claimed in the concluding portion of the specification. The invention, however, both as to organization and method of operation, together with further advantages and objects thereof, may best be understood by reference to the following description taken in connection with the accompanying drawings wherein like reference characters refer to like elements.

DETAILED DESCRIPTION

Figure 1:
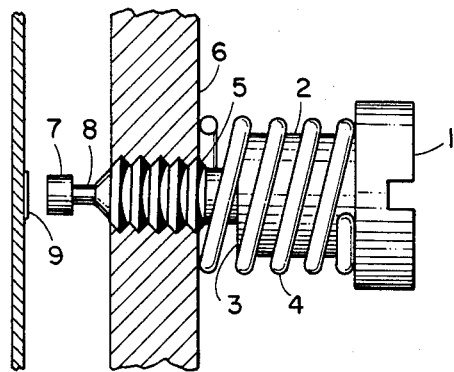
FIG. 1 is a side view of a first embodiment of the present invention, showing the screw not making contact with a circuit board or substrate.

Referring first to FIG. 1, a first embodiment of the invention is shown in side view. Screw head 1 is connected to first cylindrical portion 2 having a diameter greater than the diameter of the hole receiving the screw in panel or frame 6 of an electronic instrument. The first cylindrical portion extends longitudinally to stop rotation and longitudinal travel of the screw when shoulder 3 contacts panel 6. Spring 4 is coiled around the outside circumference of the first cylindrical portion and applies longitudinal pressure to the screw in order to prevent undesired rotational or axial travel after adjustment is completed.

Second cylindrical portion 5 is of smaller diameter and is circumferentially threaded to mesh with and turn in a threaded hole in panel 6. Capacitive element 7 extends on a plunger shaft 8 from the end of the second cylindrical portion. This element functions as one plate of a capacitor while the opposing plate is represented by corresponding element 9 on the surface of an electrical circuit board or IC or hybrid circuit substrate. When the screw is turned, the clearance between the two plates or elements is adjusted in order to adjust the operating behavior and calibration of an electronic instrument.

Figure 2:
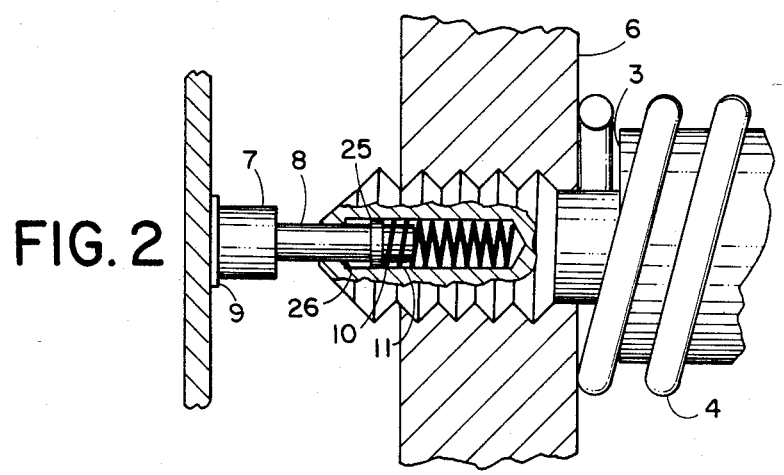
FIG. 2 is an enlarged side view in cross-section, showing the screw making contact with the circuit board or substrate.

Referring now to FIG. 2, if the operator mistakenly turns the adjusting screw so that element 7 contacts corresponding element 9 on the circuit board or substrate, plunger shaft 8 slides into longitudinal cavity 11 in the second cylindrical portion. Thus, longitudinal movement of element 7 is stopped before the circuit board or substrate is damaged or crushed when the screw exerts pressure on the surface of the circuit board or substrate. Although the operator ordinarily does not intend to bring the screw into contact with the board or substrate, he occasionally may be unaware of contact and will continue turning the screw. Shoulder 3 will contact panel 6 to stop rotation and longitudinal travel of the screw before the slidable length of plunger shaft 8 is exhausted. Spring 10 inside the cavity forces the shaft and element into the extended position when the screw is not in contact with the board or substrate, so the screw may repeatedly be turned too far and contact the board or substrate during calibration without damaging the same. Shaft 8 suitably includes a stop 25 for abutting shoulder 26 within the cavity to define said extended position, or for sliding within the cavity with close fit in the absence of a shoulder 26.

Figure 3:
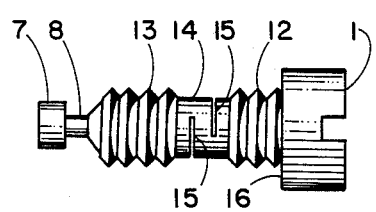
FIG. 3 is a side view of a second embodiment of the present invention.

Referring now to FIG. 3, a second embodiment of the invention is shown in side view. This embodiment of the screw includes screw head 1, first threaded portion 12, intermediate unthreaded portion 14, and second threaded portion 13. The intermediate unthreaded portion is cut with two opposing slots 15. The screw is compressed before use so that the slots are narrowed and the threaded portions are offset or slightly misaligned longitudinally. When the screw is used, the slots are opened or pulled apart so the two threaded portions are stretched to align and mesh with the threads of the hole. This type of screw, known as the Johansen screw, is self-locking due to the longitudinal pressure of each threaded portion against the threads of the hole. The present invention further includes capacitive element 7 on plunger shaft 8 extending from a cavity inside the second threaded portion. This capacitive element and plunger shaft functions in the manner described in the first embodiment. The screw head also extends to shoulder 16 to stop rotation and longitudinal travel of the screw when the shoulder contacts the panel or frame of an electronic instrument. To prevent damage to the circuit board or substrate, the shoulder stops travel of the screw before the plunger shaft slides completely into the cavity.

Figure 4:
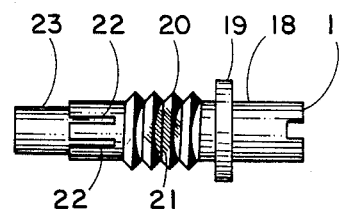
FIG. 4 is a side view of a third embodiment of the present invention.

Referring now to FIG. 4, a third embodiment of the invention is shown in side view. This embodiment includes screw head 1, first unthreaded portion 18, shoulder 19, and second threaded portion 20. The outer surface of the second threaded portion is partially coated at 21 with a resilient material such as nylon in order to prevent undesired travel of the screw after adjustment. The tip of the second threaded portion is cut with a plurality of longitudinal slots 22, with the tip between the slots being directed slightly inwardly to frictionally hold slidable capacitive element 23 in a longitudinal cavity within the second threaded portion. Longitudinal movement of the screw is suitably stopped by shoulder 19 before the length of capacitive element 23 is exhausted.

While preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An adjusting screw for capacitively tuning electrical circuits, comprising:
a first cylindrical portion having a diameter greater than the diameter of a hole receiving said adjusting screw,
a second smaller diameter cylindrical portion circumferentially threaded and having a longitudinal cavity,
and a capacitive element extending from the end of said second cylindrical portion and longitudinally slidable into said cavity within said second cylindrical portion.

2. The adjusting screw according to claim 1 including spring means within said cavity and adapted to force said capacitive element into an extended position from said cavity.

3. The adjusting screw according to claim 1 further including a spring coiled around the outside circumference of said first cylindrical portion, wherein said spring applies pressure to the screw to prevent undesired travel.

4. The adjusting screw according to claim 1 including a shoulder on said first cylindrical portion to stop longitudinal movement of the screw at a desired position.

5. The adjusting screw according to claim 1 and an electrical circuit board or substrate wherein said capacitive element is slidably received within said cavity when said element contacts said electrical circuit board or substrate on one side of said hole.

6. A device for varying the clearance between two electrical elements coacting as a capacitor, comprising:
a circumferentially threaded screw having a longitudinal cavity,
a first electrical element extending from the end of said screw,
and a second electrical element on the surface of an electrical circuit board or substrate,
said first electrical element being slidably received within said cavity when said first element contacts said second element.

7. The device according to claim 6 wherein said screw includes two threaded portions with an intermediate unthreaded portion longitudinally disposed between said threaded portions,
said unthreaded portion being cut with a plurality of slots,
said screw being compressed before use by narrowing the slots and varying the longitudinal distance between the two threaded portions.

8. The device according to claim 6 wherein said threaded screw includes a portion of threads coated with a resilient material on the outer circumference of said portion of threads.

9. The device according to claim 6 wherein said threaded screw includes a plurality of longitudinal slots cut into the tip of said threaded screw, with said tip portion frictionally grasping said first electrical element.

10. The device according to claim 6 wherein said cavity includes spring means adapted to force said electrical element into an extended position from said cavity.

11. The device according to claim 6 wherein said threaded screw includes a shoulder portion to stop longitudinal movement of the screw at a desired position.

* * * * *